United States Patent Office 3,216,966
Patented Nov. 9, 1965

3,216,966
HIGH STRENGTH CONCRETE FROM HYDRAULIC CEMENT, AGGREGATE, AN ALDEHYDE (FORMALDEHYDE, GLYOXAL), AND A PHENOL (RESORCINOL, PHLOROGLUCINOL)
James D. Collins, 5228 Bevedere Drive, Indianapolis, Ind., and Edward L. Shriver, 4505 SE. Garth Road, Huntsville, Ala.
No Drawing. Filed Sept. 8, 1964, Ser. No. 395,058
5 Claims. (Cl. 260—38)

This application is a continuation-in-part of our co-pending application Serial No. 56,685, filed September 19, 1960.

This invention relates to improved cement-containing compositions. More particularly, this invention relates to ultra high-strength concrete compositions containing a minor amount of a polyhydric phenol-aldehyde condensation product formed in situ during the curing of the concrete.

While ordinary concrete is an eminently satisfactory material for the construction of roads, sidewalks, buildings, floors, and the like, there are certain special situations wherein an improvement in the properties of concrete is desirable, particularly with regard to tensile strength and compressive strength. Furthermore, ordinary concrete crumbles under excessively high temperatures; it is slightly absorbent for water; it is subject to dusting; and is not too resistant to chemical attack. Finally, concrete can be poured at freezing temperatures only with the addition of salt solutions, and the resulting concrete is thereby weakened.

It is an object of this invention to provide concrete compositions having improved compressive strength and tensile strength, which compositions are capable of withstanding excessively high heats without crumbling.

It is a further object of this invention to provide cement compositions which can be poured and cured at freezing temperatures without the use of either salt solutions or external heat.

It is a still further object of this invention to provide concrete compositions which set very rapidly.

In accordance with the invention there is provided an ultra high-strength concrete composition containing a major amount of a concrete formed from water, hydraulic cement, and mineral aggregate, and a minor amount of an in situ-formed cross-linked condensation product of a polyhydric phenol selected from the group consisting of resorcinol and phloroglucinol and an aldehyde selected from the group consisting of formaldehyde and glyoxal.

The novel concrete compositions of the invention are made in a variety of ways. For example, the required amount of polyhydric phenol can be dissolved in aqueous formaldehyde solution. This solution is in turn added to the usual mixture of hydraulic cement and mineral aggregate. The water present in the solution furnishes some or all of the water required to give a slurry of the desired consistency and for the hydration of the cement in forming concrete. Additional water can be added if desired. The hydraulic cement, water, mineral aggregate, and resin-forming ingredients are thoroughly mixed and then poured into forms. The mixing and pouring must be completed in less time than is required with ordinary concrete, because of the extreme rapidity with which the composition of this invention sets up.

In lieu of using an aqueous solution of aldehyde, the resin-forming ingredients can be mixed with the hydraulic cement and mineral aggregate in the dry state and then the desired amount of water can be added to give an easily worked slurry, which is rapidly poured into forms as described hereinabove.

A hydraulic cement is a material that forms a bond, as between blocks of stone, by virtue of a chemical reaction with water; the product of such reaction being a hard, stone-like substance which, from the time of its formation, is resistant to disintegration in water. Hydraulic cements consist chiefly of the oxides of calcium, aluminum, silica, magnesium, and iron with small and variable amounts of the oxides of sodium, potassium, and titanium. These cements can also contain a minor amount of calcium sulfate. The most probable chemical compositions of the most popular hydraulic cement, Portland cement, is 42.0 percent of tricalcium silicate, 34.0 percent dicalcium silicate, 9.5 percent tetracalcium aluminoferrite, and 6.7 percent tricalcium aluminate. Other cements, low-heat cement, for example, will contain higher amounts of dicalcium silicate and tetracalcium aluminoferrite and lower amounts of the other two ingredients than ordinary Portland cement. Similarly, sulfate-resistant cements contain more of the calcium silicates and less of the other two ingredients than Portland cement. The term "hydraulic cement" in its ordinary meaning and as used in this specification includes any cement capable of setting and hardening under water by virtue of the interaction of the water and the constituents of the cement. Specific useful hydraulic cements other than those noted hereinabove are listed in the Encyclopedia of Chemical Technology by Kirk and Othmer, Interscience Publishers, Inc. (1949), volume 3, p. 411 et seq. Portland cement is the preferred hydraulic cement for use in our novel compositions.

The term "mineral aggregate" as used in the above description of the invention means any of the many materials, singly or in combination, which have been used in the past to prepare concrete and their equivalents. Suitable mineral aggregates includes sand, gravel, crushed rock, broken concrete, slag, bricks, clinker, etc. Mineral aggregates of particular value for the purposes of this invention include mixtures of sand with pebbles or flints from gravel beds, crushed granite, gneiss, trap, hard sandstone, and other similar materials.

Aldehydes useful in preparing the compositions of this invention are limited to glyoxal or formaldehyde in any one of its various forms, i.e., Formalin or paraformaldehyde. Other aldehydes, such as propionaldehyde and isobutylaldehyde, fail to react with the mix at room temperature. Formaldehyde is the preferred aldehyde for use in the invention. As noted above, the formaldehyde can be added to the mix as Formalin (a commercially available 37 percent aqueous solution) or as paraformaldehyde (a dry, powdered, polymerized form of formaldehyde). The aldehyde should be added in such a manner that it can be thoroughly contacted with the polyhydric phenol and uniformly dispersed throughout the cement mix to provide a homogeneous distribution of the in situ-formed resin in the final cured product.

Polyhydric phenols useful in the invention are limited to resorcinol and phloroglucinol. Other phenolics, such as phenol, 3,5-xylenol, and catechol give crumbly products with low compressive strength. Resorcinol, because of its lower cost and greater availability, is the preferred polyhydric phenol. The polyhydric phenol and formaldehyde can be pre-reacted to the extent that the pre-reacted product remains completely water-soluble at the time of its introduction to the concrete mix. Thus, various methylolated resorcinols can be used, including water-soluble resorcinol-formaldehyde resins containing up to 0.8 mole of formaldehyde per mole of phenolic body. Resorcinol can also be used in its dimeric, or condensed, form; i.e., trihydroxydiphenyl.

The ratio of aldehyde to polyhydric phenol employed in our novel compositions can vary from about 1.25 moles of aldehyde to about 3 moles of aldehyde per mole of polyhydric phenol. As is well understood in the polymer art, the greater the amount of formaldehyde present, the greater the amount of cross-linking to be found in the final product. For some concrete compositions, however, a high degree of cross-linking of the in situ-formed resin is not necessarily desirable. In the preferred compositions, we employ about 1.5 to 2 moles of formaldehyde for each mole of resorcinol used, inasmuch as the concrete compositions containing resorcinol-formaldehyde resins containing the above monomer ratios have highly improved properties when compared with ordinary concrete.

The amount of resin formed in situ in our novel concrete composition is generally based upon the amount of hydraulic cement present and can vary from about one part of resin to from about one to about ten parts of hydraulic cement, all parts being by weight. Ratios of hydraulic cement to resin in the range 1–1 to 5–1 are preferable, since the concrete compositions containing these ratios have greatly improved tensile strength and compressive strength. If greater than about five parts cement is used, the mix tends to be dry and more water than usual must be added. If greater than ten parts cement is used, the strength properties of the novel concrete cannot be obtained. If less than one part cement is used, the mix becomes too thin and excessive bleeding occurs.

The ratios of hydraulic cement to mineral aggregate or filler, such as sand, gravel, asbestos, etc., present in the compositions of this invention are those customarily employed in the cement art and vary from one part of cement to three to seven parts of mineral aggregate, depending upon the use to which the concrete is to be put. If greater than seven parts aggregate is used, the strength of the resulting concrete is appreciably diminished.

In forming our novel compositions certain constituents of hydraulic cement apparently act as a catalyst for the polymerization of the polyhydric phenol and aldehyde, because the slurry becomes very hot upon mixing and aldehyde fumes are sometimes given off. It is this heat of polymerization, a kind of internal heat source, which permits the concrete compositions of this invention to be mixed and poured at or near freezing temperatures. The rate of the polymerization, and thus the rate of heating, can be increased by the addition of free alkali and can be decreased by the addition of inert diluents, such as the mineral aggregate, by the amount of water added to the cement mixture and by the rate of addition of the water. In general, the more water that is added, the slower the polymerization reaction.

The water initially added to the dry mixture of hydraulic cement and mineral filler gives a workable slurry which can be poured into forms. As the concrete sets in the form, however, this added water hydrates the hydraulic cement to give the mixture of mineral aggregate and hydrated cement which is known generically as concrete. The amount and uniformity of hydration determines to a large degree the properties of the final concrete, particularly as regards tensile and compressive strength. The polymerization reaction between the polyhydric phenol and aldehyde, which, if initiated in the cement slurry at the time of mixing, also furnishes water, one molecule of water being given off for each reaction between one aldehyde and two polyhydric phenol molecules. Thus, the polymerization reaction, as it proceeds to completion within the concrete, furnishes added water for the hydration of the hydraulic cement. This internally provided water is provided more uniformly and efficiently than is possible with the use of externally added water alone. Thus, this molecular hydration, made possible by the polymerization reaction between the polyhydric phenol and aldehyde which takes place within the setting concrete, contributes to the increased strength of the concrete compositions of this invention.

The amount of water added during the mixing of the concrete is not particularly critical. The mix must contain sufficient water to make it workable and less than that amount which causes excessive bleeding. Generally, it is convenient to add about 25–50 parts by weight water for each 100 parts by weight of hydraulic cement plus polyhydric phenol.

In addition to the more efficient hydration of the hydraulic cement provided by the water furnished during the in situ polymerization reaction, the heat of the polymerization reaction also makes possible, as set forth previously, the mixing of the concrete compositions of this invention at lower temperatures than is possible with ordinary concrete. Furthermore, the presence of the uniformly dispersed polymer therein strengthens the resulting concrete, particularly the tensile and compressive strengths. The novel concretes as provided by our invention also have increased internal damping and greater resistance to heat in that the concretes maintain their structural characteristics at temperatures which crumble ordinary concretes. Our novel concrete compositions are also characterized by improved insulating properties, greater resistance to chemical attack, and lessened absorption of water, compared with ordinary concrete. This last property decreases the dusting and hairline cracking of concrete surfaces in winter in cold climates caused by absorption of water in the surface area of the concrete followed by freezing and expansion of the water in the surface layer.

As might be predicted from the greately improved properties of resin-containing concretes of our invention, the in situ-formed resin or polymer substantially modifies the characteristic structure of concrete, although it does not measurably change the crystal structure of the hydraulic cement phase. The modification of the character of the concrete is evidenced not only by the above-cited improvement in the properties, but also by qualitative changes in the X-ray diffraction pattern and by the fact that the concretes of our invention, unlike ordinary concretes, maintain their structure when heated to 4000° F.

Our invention is further illustrated by the following examples:

*Example 1*

75 cc. of a mixture containing 36.3 (0.3 mole) of resorcinol and 36.1 cc. of a 37 percent aqueous formaldehyde solution containing about 12 g. of formaldehyde (0.4 mole) were thoroughly mixed with 116.5 g. of Portland cement and 350 g. of sand. The mixture immediately became quite hot. About 15 minutes after mixing, the concrete set to such an extent that no further stirring was possible. The concrete was allowed to cure for one week. It had a density of 140 lbs. per cubic foot.

Tests show that concrete prepared as specified above has double the tensile and compressive strength of concrete prepared from 116.5 g. of Portland cement, 350 g. of sand and water q.s.

*Example 2*

The preparation of Example 1 was repeated except that 233 g. of Portland cement were used instead of 116.5 g. The resulting concrete had properties in all ways similar to that of Example 1.

In either of the above examples, 36.3 g. of resorcinol and 12 g. of paraformaldehyde can be mixed dry with the the Portland cement and sand with the requisite amount of water being added to the dry mixture.

*Example 3*

A mixture was prepared containing 208.5 parts by weight of mineral aggregate (sand), 69.7 parts by weight of type 1 Portland cement, 26.9 parts by weight of resorcinol, 14.8 parts by weight of paraformaldehyde and 25 cc. of water. The resulting concrete had a compressive strength of 5790 p.s.i. after seven days' cure.

Substantially similar results will be obtained if finely divided gravel is used as the mineral aggregate.

Example 4

Another similar concrete was prepared by adding four parts of sand to one part of a cementitious mixture prepared from 60 parts of finely ground blast furnace slag, six parts of type 1 Portland cement, 26.7 parts of resorcinol, 13.3 parts of paraformaldehyde and 32 parts of water. The concrete had a set up time of about 35 minutes and a 24 hour compressive strength of 3730 p.s.i.

Cement-resin compositions prepared as set forth in Examples 1-4 have been used to repair spalled areas of concrete driveways and the materials have also been successfully united. These compositions are also useful to prepare floor toppings for areas subjected to attack from acids or alkalis or as mortar for brick or a lining for tile or pipe subjected to similar attack. The low thermal conductivity of our novel compositions, as exemplified in the examples above, makes them particularly suitable as toppings for concrete launching pads for rockets. In addition, the high heat developed during the rapid cure of these concretes makes our novel compositions particularly useful in those climatic areas where freezing weather can be anticipated, since, unlike concrete made resistant to freezing by the addition of calcium chloride or other salts, the properties of the cured concrete will be equal to, or better than, the same concrete prepared with no additives.

Example 5

The procedure of Example 1 was repeated using a soluble resorcinol-formaldehyde resin containing 0.67 mole of formaldehyde per mole of resorcinol. Two additional moles of formaldehyde were added during the formulation of the mix. The resulting cured concrete composition had a compressive strength of 1700 p.s.i. after three hours and 2115 p.s.i. after seven days.

Example 6

Magnesium oxychloride hydraulic cement can be substituted for the Portland cement used in Example 5 with substantially similar results.

Example 7

A mixture was prepared containing 6.87 parts by weight 16.26 parts by weight type 1 Portland cement, 63.65 parts by weight sand, and 9.28 parts by weight water. The resulting mixture set up within five minutes and after seven days, cured to a high compressive strength.

Example 8

The procedure of Example 7 was repeated substituting 6.87 parts by weight phenol for the phloroglucinol. After six hours, the resulting concrete was still soft and after seven days' cure, remained soft and crumbly.

Similarly poor results were obtained with hydroquinone and m-cresol.

We claim:
1. A cementitious mixture suitable for the preparation of ultra high-strength concrete upon the addition of water comprising 1-10 parts by weight hydraulic cement, 3-7 parts by weight mineral aggregate per part hydraulic cement, 1 part by weight of a polyhydric phenol selected from the group consisting of resorcinol and phloroglucinol, and 1.25-3 moles, per mole of polyhydric phenol, of an aldehyde selected from the group consisting of formaldehyde and glyoxal.

2. An ultra high-strength concrete prepared from 1-10 parts by weight hydraulic cement, 3-7 parts by weight mineral aggregate per part hydraulic cement, 1 part by weight of a polyhydric phenol selected from the group consisting of resorcinol and phloroglucinol, 1.25-3 moles, per mole of polyhydric phenol, of an aldehyde selected from the group consisting of formaldehyde and glyoxal, and sufficient water to hydrate the cement.

3. An ultra high-strength concrete prepared from 1-10 parts by weight hydraulic cement, 3-7 parts by weight mineral aggregate per part hydraulic cement, 1 part by weight resorcinol, 1.25-3 moles, per mole of resorcinol, of formaldehyde, and sufficient water to hydrate the cement.

4. An ultra high-strength concrete prepared from 1-10 parts by weight Portland cement, 3-7 parts by weight mineral aggregate per part Portland cement, 1 part by weight resorcinol, 1.25-3 moles formaldehyde, and sufficient water to hydrate the cement.

5. An ultra high-strength concrete prepared by admixing 1-5 parts by weight Portland cement, 3-7 parts by weight sand per part Portland cement, 1 part by weight resorcinol, 1.5-2 moles, per mole resorcinol, of formaldehyde, and from 25-50 parts by weight water for each 100 parts by weight Portland cement plus resorcinol.

References Cited by the Examiner

UNITED STATES PATENTS 2,512,716   6/50   Courtney _____ 260—38 XR
3,016,092   1/62   Harvey et al. _____ 260—38 XR

FOREIGN PATENTS 569,489   5/45   Great Britain.

MORRIS LIEBMAN, *Primary Examiner.*

UNITED STATES PATENT OFFICE
CERTIFICATE OF CORRECTION

Patent No. 3,216,966                        November 9, 1965

James D. Collins et al.

It is hereby certified that error appears in the above numbered patent requiring correction and that the said Letters Patent should read as corrected below.

Column 5, line 20, for "particularily" read -- particularly --; line 43, after "weight" insert -- phloroglucinol, 3.77 parts by weight paraformaldehyde, --.

Signed and sealed this 27th day of December 1966.

(SEAL)

Attest:

ERNEST W. SWIDER
Attesting Officer

EDWARD J. BRENNER
Commissioner of Patents